United States Patent
Hiasa

(10) Patent No.: US 11,188,777 B2
(45) Date of Patent: Nov. 30, 2021

(54) IMAGE PROCESSING METHOD, IMAGE PROCESSING APPARATUS, LEARNT MODEL MANUFACTURING METHOD, AND IMAGE PROCESSING SYSTEM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/808,526

(22) Filed: Mar. 4, 2020

(65) Prior Publication Data
US 2020/0285883 A1 Sep. 10, 2020

(30) Foreign Application Priority Data

Mar. 5, 2019 (JP) .............................. JP2019-039089

(51) Int. Cl.
*G06K 9/40* (2006.01)
*G06K 9/62* (2006.01)

(52) U.S. Cl.
CPC .............. *G06K 9/40* (2013.01); *G06K 9/621* (2013.01); *G06K 9/6257* (2013.01); *G06K 2209/19* (2013.01)

(58) Field of Classification Search
CPC ........ G06K 9/40; G06K 9/621; G06K 9/6257; G06K 2209/19
See application file for complete search history.

(56) References Cited

U.S. PATENT DOCUMENTS 8,798,389 B2 8/2014 Hatakeyama
9,152,870 B2 * 10/2015 Sawhney .............. G06K 9/6253

FOREIGN PATENT DOCUMENTS

JP 2011123589 A 6/2011
JP 2019008599 A 1/2019

OTHER PUBLICATIONS

Shocher et al., "Zero-Shot" Super-Resolution using Deep Internal Learning, 2018, Proceedings of the IEEE Conference on Computer Vision and Pattern Recognition, pp. 3118-3126 (9 pages) (Year: 2018).*
Xu, Li, et al. "Deep convolutional neural network for image deconvolution." 2014, Advances in neural information processing systems 27 (9 pages) (Year: 2014).*
Extended European Search Report issued in European Appln. No. 20160938.5 dated Oct. 22, 2020.
Shocher. ""Zero-Shot" Super-Resolution using Deep Internal Learning". IEEE/CVF Conference on Computer Vision and Pattern Recognition. 2018: 3118-3126. Cited in NPL 1.
(Continued)

*Primary Examiner* — David F Dunphy
(74) *Attorney, Agent, or Firm* — Rossi, Kimms & McDowell LLP

(57) ABSTRACT

An image processing method includes a first step configured to obtain a first ground truth image and a first training image, a second step configured to generate a second around truth image and a second training image by applying mutually correlated noises to the first ground truth image and the first training image, and a third step configured to make a neural network learn based on the second ground truth image and the second training image.

21 Claims, 12 Drawing Sheets

(56) References Cited

OTHER PUBLICATIONS

Lore. "LLNet: A deep autoencoder approach to natural low-light image enhancement". Pattern Recognition. 2017: 650-662. vol. 61. Cited in NPL 1.

Lecun. "Gradient-Based Learning Applied to Document Recognition". Proceedings of the IEEE. Nov. 1998: 2278-2323. vol. 86, No. 11. Cited in NPL 1.

* cited by examiner

IMAGE PROCESSING METHOD, IMAGE PROCESSING APPARATUS, LEARNT MODEL MANUFACTURING METHOD, AND IMAGE PROCESSING SYSTEM

BACKGROUND OF THE INVENTION

Field of the Invention

The present invention relates generally to an image processing method configured to suppress an image noise variation associated with image processing.

Description of the Related Art

Japanese Patent Laid-Open No. ("JP") 2011-123589 discloses a method of obtaining a high-resolution image from a captured image by correcting blurs caused by the aberration using processing based on a Wiener filter.

However, the method disclosed in JP 2011-123589 amplifies an image noise as the resolution and contrast become higher since as not being able to distinguish between an object and the noise.

SUMMARY OF THE INVENTION

The present invention provides an image processing method and the like that can suppress an image noise variation associated with image processing.

An image processing method according to one aspect of the present invention includes a first step configured to obtain a first ground truth image and a first training image, a second step configured to generate a second ground truth image and a second training image by applying mutually correlated noises to the first ground truth image and the first training image, and a third step configured to make a neural network learn based on the second ground truth image and the second training image.

A learnt model manufacturing method following the above image processing method constitute another aspect of the present invention.

An image processing method as an aspect of the present invention includes the steps of inputting a captured image to a neural network, and generating an estimated image on which at least one of resolution enhancing processing, contrast enhancing processing, and brightness improving processing has been performed, and performing denoising processing on an image based on the estimated image.

An image processing apparatus configured to perform the above image processing method also constitutes another aspect of the present invention.

Further features of the present invention will become apparent from the following description of exemplary embodiments with reference to the attached drawings.

DESCRIPTION OF THE EMBODIMENTS

Figure 1:
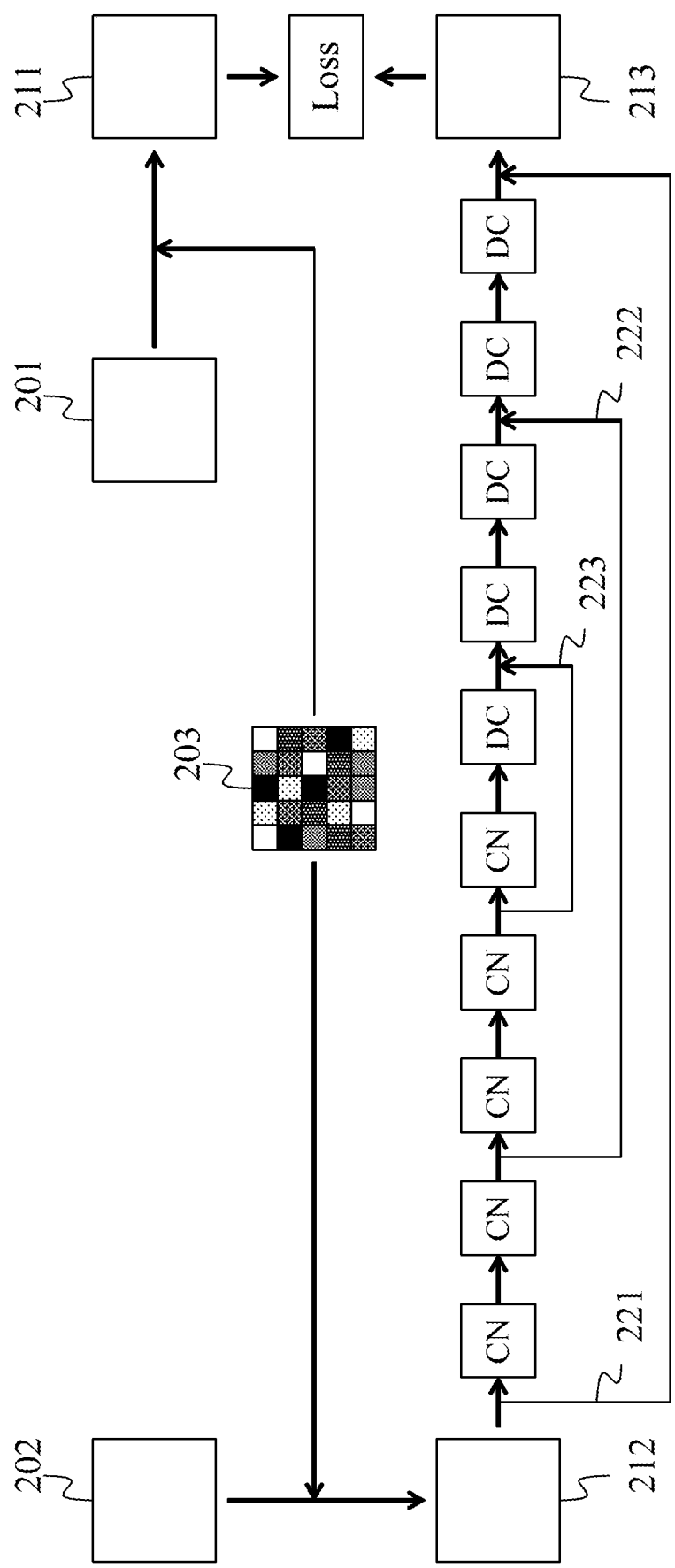
FIG. 1 is a diagram illustrating a flow of neural network learning according to a first embodiment.

Referring now to accompanying drawings, a detailed description will be given of embodiments according to the present invention. Corresponding elements in respective figures will be designated by the same reference numerals, and a description thereof will be omitted.

At first, before a specific description of the embodiments, the gist of the present invention will be given. The present invention uses a multilayer neural network for image processing in order to suppress an image noise variation associated with image processing (resolution enhancing, contrast enhancing, brightness improving, and the like). Weight learning where the weight (such as filters and biases) is to be used in the multilayer neural network, applies mutually correlated noises to a first ground truth image and a first training image, and generates a second ground truth image and a second training image. The mutually correlated noises are, for example, based on the same random number. For example, when image processing to be executed is resolution enhancing, the first training image is a low-resolution image, and the first ground truth image is a high-resolution image. The second training image is input into the multilayer neural network, and the weight is optimized in order that an error between an output and the second ground truth image is small. In this case, the second around truth image and the second training image have the mutually correlated noises, for example, based on the same random number. Thus, the neural network can learn the weight for the resolution enhancing while suppressing a noise variation. That is, it is possible to generate a learnt model that can enhance the resolution while suppressing the noise variation.

Although the resolution enhancing has been described as an example, the following embodiments are also applicable to image processing such as contrast enhancing, brightness improving, defocus blur conversion, and lighting conversion, while the noise variation is suppressed.

First Embodiment

Now, an image processing system according to the first embodiment of the present invention will be described. This embodiment makes a multilayer neural network learn and execute a blur correction. However, the present invention is not limited to the blur correction, but is applicable to the other image processing.

Figure 2:
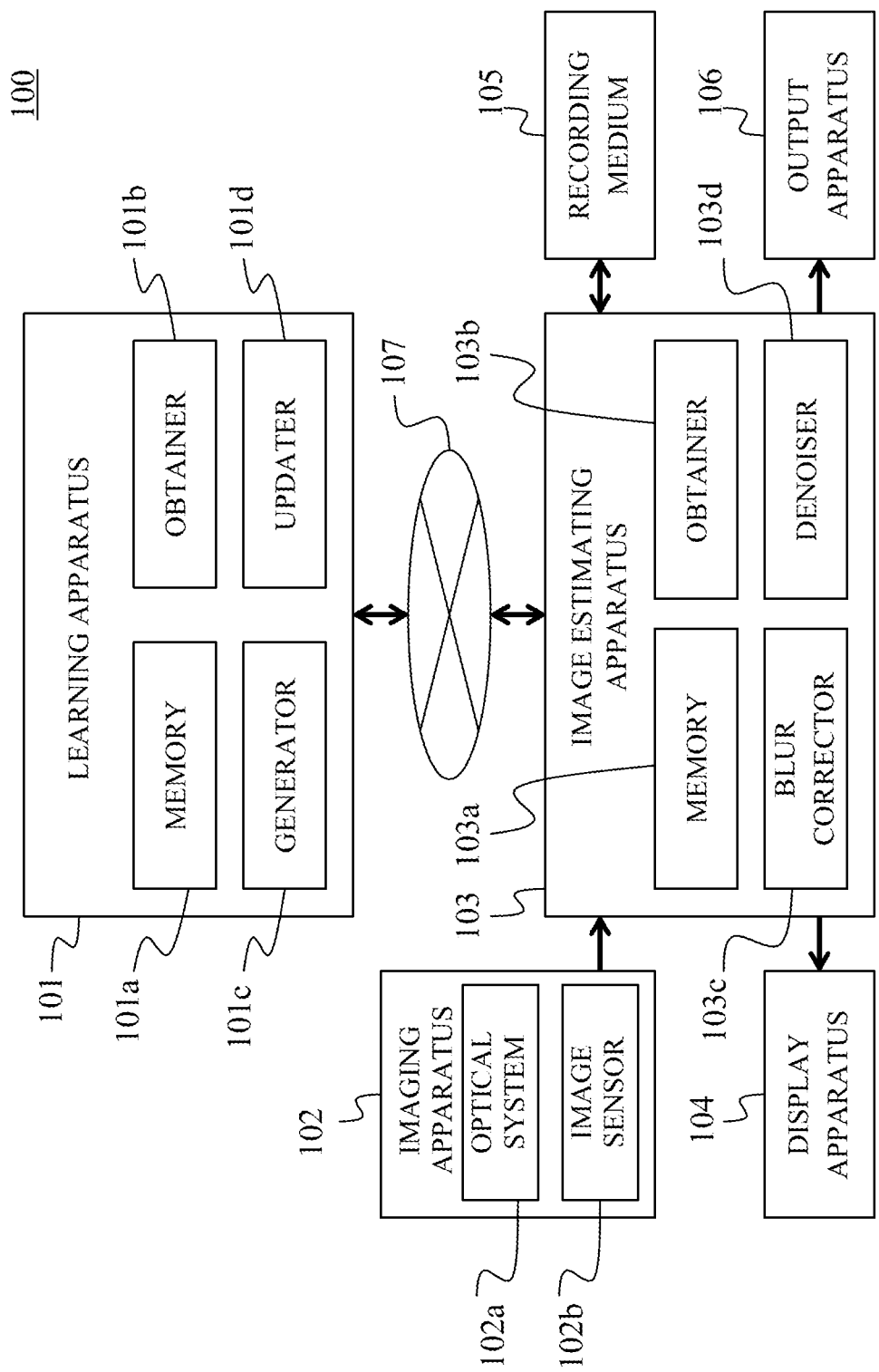
FIG. 2 is a block diagram of an image processing system according to the first embodiment.
Figure 3:
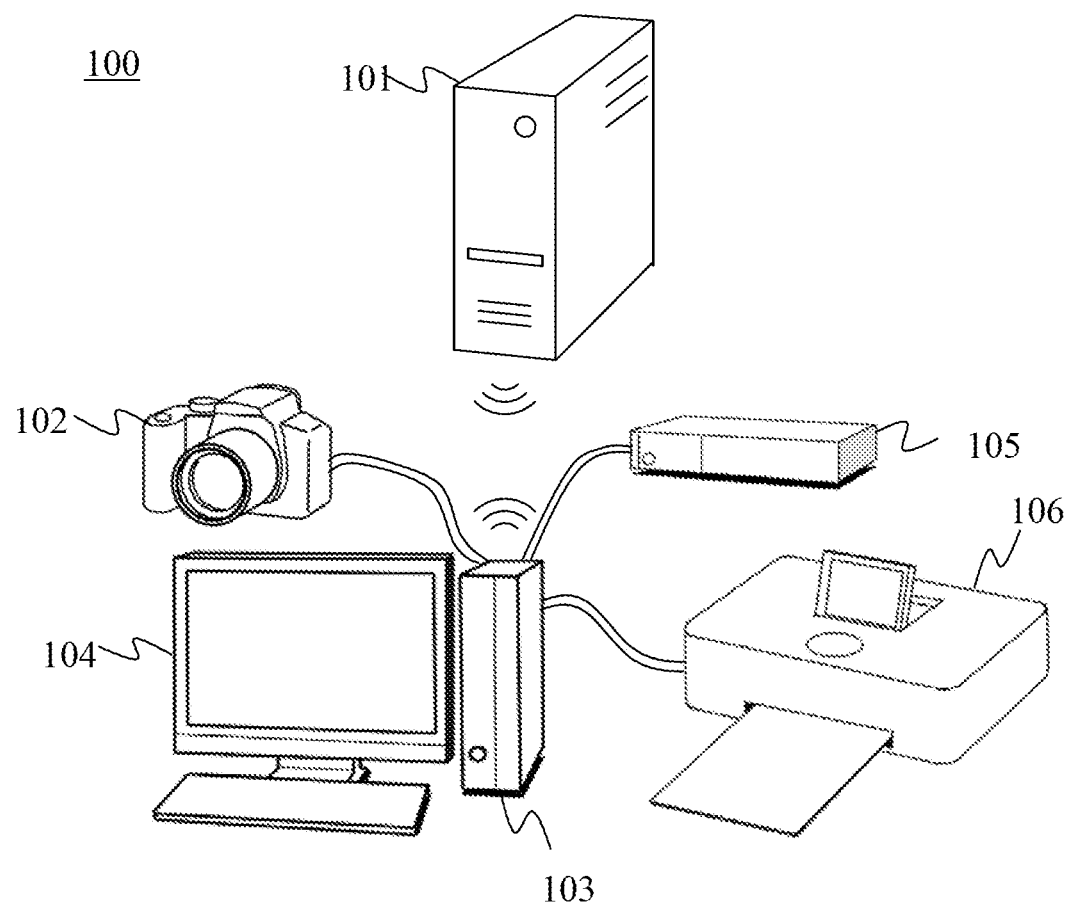
FIG. 3 is an external view of the image processing system according to the first embodiment.

FIG. 2 is a block diagram of an image processing system 100 according to this embodiment. FIG. 3 is an external view of the image processing system 100. The image processing system 100 includes a learning apparatus (image processing apparatus) 101, an imaging apparatus 102, an image estimating apparatus (image processing apparatus) 103, a display apparatus 104, a recording medium 105, an output apparatus 106, and a network 107. The learning apparatus 101 includes a memory 101a, an obtainer 101b, a generator 101c, and an updater (learner) 101d.

The imaging apparatus 102 includes an optical system 102a and an image sensor 102b. The optical system 102a condenses light entering the imaging apparatus 102 from an object space. The image sensor 102b receives (photoelectrically converts) an optical image (object image) formed via the optical system 102a, and obtains a captured image. The image sensor 102b is, for example, a CCD (Charge Coupled Device) sensor or a CMOS (Complementary Metal-Oxide Semiconductor) sensor. The captured image obtained by the imaging apparatus 102 includes a blur caused by an aberration and a diffraction of the optical system 102a and a noise caused by the image sensor 102b.

The image estimating apparatus 103 includes a memory 103a, an obtainer 103b, a blur corrector (estimator) 103c, and a denoiser 103d. The image estimating apparatus 103 obtains the captured image, performs a blur correction while suppressing a noise variation, and generates an estimated image. The blur correction uses a multilayer neural network, and weight information is read from the memory 103a. The weight (weight information) has been learned in the learning apparatus 101, and the image estimating apparatus 103 reads out the weight information from the memory 101a via the network 107 in advance and records the weight information on the memory 103a. The weight information to be recorded may be a weight value itself or may be in an encoded format. Details relating to the weight learning and the deblurring processing using the weight will be described later. The image estimating apparatus 103 generates an output image by correcting a blur and adjusting an intensity of denoising (denoising processing) on the estimated image.

The output image is output to at least one of the display apparatus 104, the recording medium 105, and the output apparatus 106. The display apparatus 104 is, for example, a liquid crystal display or a projector. The user can perform editing work or the like while checking an image being processed via the display apparatus 104. The recording medium 105 is, for example, a semiconductor memory, a hard disk drive, a server on a network, or the like. The output apparatus 106 is a printer or the like. The image estimating apparatus 103 has a function of performing developing processing or the other image processing as needed.

Figure 4:
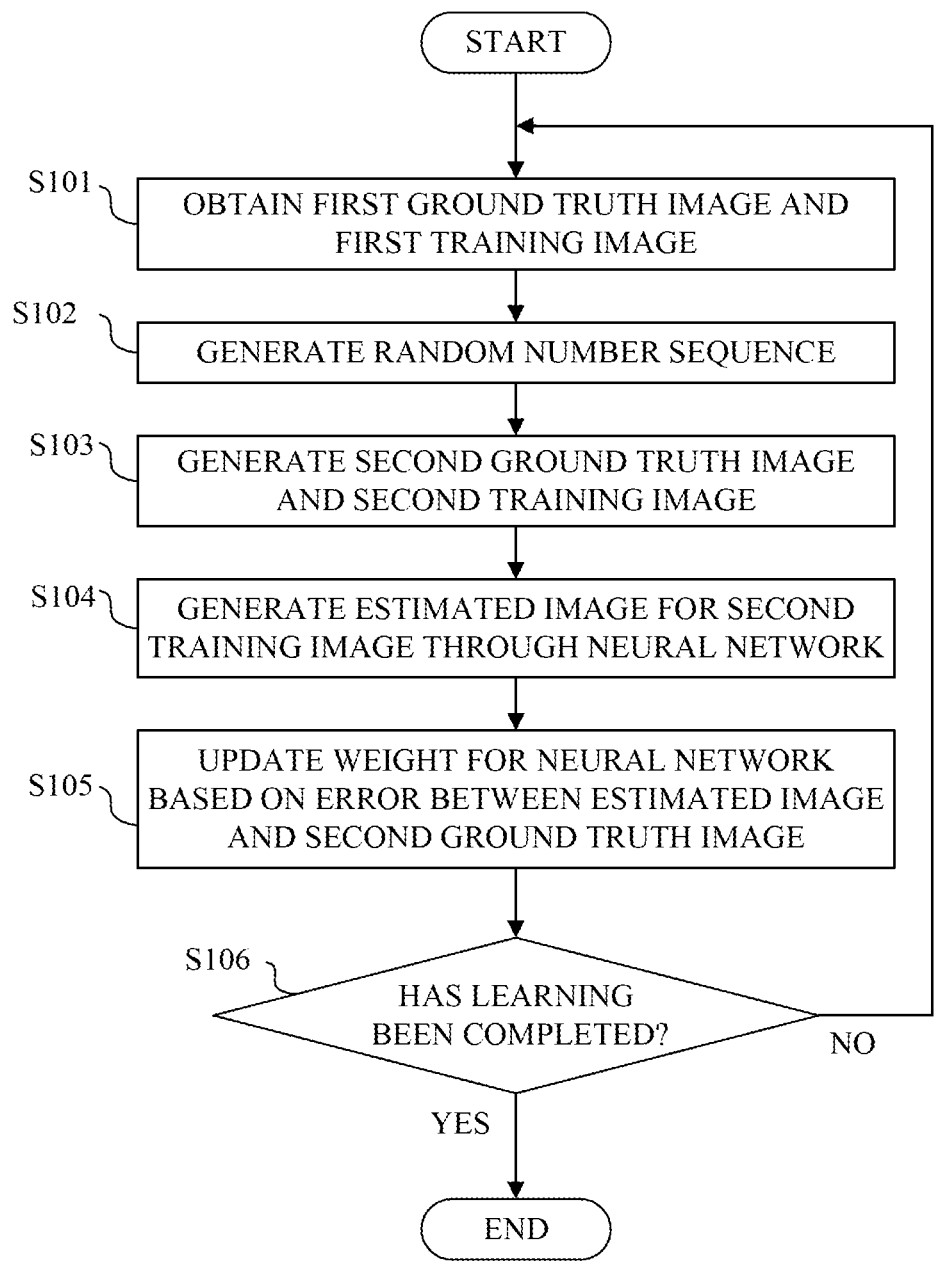
FIG. 4 is a flowchart relating to weight learning according to the first embodiment.

Referring now to FIGS. 1 and 4, a description will be given of a weight (weight information) learning method (a learnt model manufacturing method) executed by the learning apparatus 101 in this embodiment. FIG. 1 illustrates a flow of the weight learning of a neural network. FIG. 4 is a flowchart relating to the weight learning. Mainly, the obtainer 101b, the generator 101c, or the updater 101d of the learning apparatus 101 executes each step in FIG. 4.

First, in the step S101 in FIG. 4, the obtainer 101b obtains a ground truth patch (first around truth image) and a training patch (first training image). In this embodiment, the ground truth patch is a high-resolution (high-quality) image with a small amount of blur caused by the aberration and the diffraction of the optical system 102b. The training patch that has the same captured object as that of the ground truth patch, is a low-resolution (low-quality) image with a large amount of blur caused by the aberration and the diffraction of the optical system 102b. That is, the ground truth patch is an image having a relatively small amount of blur, and the training patch is an image having a relatively large amount of blur.

A patch refers to an image having a predetermined number of pixels (for example, 64×64 pixels). The number of pixels of the ground truth patch and the training patch may not necessarily be equal to each other. This embodiment uses mini-batch learning for the weight learning of the multilayer neural network. The step S101 obtains a plurality of sets of the ground truth patch and the training patch. However, the present invention is not limited to this, and may use online learning or batch learning.

This embodiment obtains the ground truth patch and the training patch using the following method, but the present invention is not limited to this. This embodiment performs an imaging simulation using a plurality of original images recorded as objects on the memory 101a, and generates a plurality of high-resolution captured images substantially having neither an aberration nor a diffraction, and a plurality of low-resolution captured images having an aberration and a diffraction. A plurality of the ground truth patches and the training patches are obtained by extracting partial areas at the same position from each of the plurality of high-resolution captured images and the low-resolution captured images. In this embodiment, the original image is an undeveloped RAW image, and the ground truth patch and the training patch are also RAW images. However, the present invention is not limited to this, and may use a developed image. The position of the partial area indicates the center of the partial area. The plurality of the original images are images having various objects, that is, having various intensities and directions of edges, textures, gradations, flat portions, and the like. The original image may be a captured image or may be an image generated by CG (Computer Graphics).

The original image may have a signal value higher than a brightness saturation value of the image sensor 102b. Even an actual object may not fall within the brightness saturation value when the imaging apparatus 102 performs imaging under a specific exposure condition. The high-resolution captured image is generated by reducing the original image and by clipping a signal at the brightness saturation value of the image sensor 102b. Specifically, when a captured image is used as the original image, it has already been blurred due to the aberration and the diffraction and the reduction can make smaller the blur effect and provide a high-resolution (high-quality) image. If the original image sufficiently contains high-frequency components, no reduction may be made. The low-resolution captured image is generated by reducing as the same manner as that of the high-resolution captured image, by applying a blur caused by the aberration and the diffraction of the optical system 102a, and by clipping the image at the brightness saturation value. The optical system 102a has a different aberration and a different diffraction depending on a plurality of lens states (states of zoom, diaphragm, and focus), an image height, and an azimuth. Thus, a plurality of the low-resolution captured images are generated by applying a blur caused by the aberrations and the diffractions of different lens state, image height, and azimuth to the original images.

The order of the reduction and the blur application may be reversed. When the blur is applied first, it is necessary to make higher the sampling rate of the blur in consideration of the reduction. In a case of the PSF (point spread function), sampling points in a space may be made finer, and in a case of the OTF (optical transfer function), the maximum frequency may be made higher. If necessary, a component such as an optical low-pass filter included in the imaging apparatus 101 may be added to the blur to be applied. The blur to be applied during the generation of the low-resolution captured image does not include a distortion. If the distortion is large, the position of the object changes, and the object may differ between the around truth patch and the training patch. Thus, this embodiment does not correct the distortion during the neural network learning. After the blur correction, the distortion is individually corrected using a bilinear interpolation, a bicubic interpolation, or the like.

Next, a partial area of a specified pixel size is extracted from the generated high-resolution captured image and used as the ground truth patch. From the same position as the extracted position in the low-resolution captured image, the partial area is extracted, and used as the training patch. In order to use the mini-batch learning, this embodiment obtains a plurality of ground truth patches and training patches from a plurality of the generated high-resolution captured images and the generated low-resolution captured images. In actual imaging, noises occur in the image sensor 102b, but a noise application is performed in the step S103 described later. However, the original image may have a noise component. In this case, it can be considered that the ground truth patch and the training patch are generated by assuming that the object including the noise in the original image is an object. Thus, the noise in the original image does not particularly matter.

Next, in the step S102, the generator 101c generates a random number sequence. The generator 101c applies noises to the ground truth patch and the training patch based on the generated random number sequence. The random number sequence is generated using a random number generator corresponding to a noise characteristic of the image sensor 102b. This embodiment generates the random number sequence using normal random numbers, but the present invention is not limited to this, and a pseudo random number generator using uniform random numbers or irrational numbers may be used. The number of elements in the random number sequence is the same as the larger of the number of pixels of the around truth patch and the training patch. That is, one numerical value generated by a random number is assigned to each pixel of the ground truth patch and the training patch. Since not all the elements of the random number sequence have the same numerical value except in a case of extremely low probability, different numerical values are assigned to at least two pixels of the around truth patch (and the training patch). When the ground truth patch and the training patch have a plurality of channels, one numerical value is assigned to each channel Since obtaining the plurality of the ground truth patches and the training patches, this embodiment generates corresponding number of non-identical random number sequences. The order of the step S101 and the step S102 may be reversed.

In the step S103, the generator 101c generates a noise ground truth patch (second ground truth image) and a noise training patch (second training image). FIG. 1 illustrates the flow from the steps S103 to S105. The generator 101c applies noises based on a random number sequence 203 to a ground truth patch 201 and a training patch 202, and generates a noise ground truth patch 211 and a noise training patch 212. The following expression (1) is used for applying the noises.

$$s_{noise}(x,y) = s_{org}(x,y) + \sigma(x,y) r(x,y) \quad (1)$$

In the expression (1), (x,y) is a two-dimensional spatial coordinate, and $s_{org}(x,y)$ is a signal value of a pixel at (x,y) of the ground truth patch 201 (or the training patch 202).

r(x,y) is a numerical value of the random number sequence 203 at (x,y), and $s_{noise}(x, y)$ is a signal value of a pixel at (x, y) of the noise ground truth patch 211 (or the noise training patch 212). σ(x,y) represents a standard deviation of a noise ($\sigma^2(x,y)$ is dispersion) and is given by the following expression (2).

$$\sigma^2(x, y) = [k_1(s_{org}(x, y) - s_0) + k_0] \frac{S_{ISO}}{100} \quad (2)$$

In the expression (2), $s_0$ is a signal value of an optical black (an image at a black level), $S_{ISO}$ is an ISO speed, and $k_1$ and $k_0$ are a proportional coefficient and a constant for a signal value at an ISO speed of 100. $k_1$ indicates an effect of shot noise, and $k_0$ indicates effects of a dark current and read noise. A noise characteristic of the image sensor 102b determines values of $k_1$ and $k_0$. A noise according to a respective signal value is applied to each of the corresponding pixels of the around truth patch 201 and the training patch 202 (referred to as corresponding pixels hereinafter) based on a common random number, and the noise ground truth patch 211 and the noise training patch 212 are generated. The corresponding pixels are pixels that have imaged the same position in the object space. Alternatively, the corresponding pixels are pixels at corresponding positions in the ground truth patch 201 and the training patch 202. A plurality of the noise ground truth patches 211 and the noise training patches 212 are generated by similarly applying the noises to the plurality of ground truth patches 201 and the training patches 202 obtained in the step S101. When the image sensor 102b supports various ISO speeds, noises of different ISO speeds are applied to the plurality of ground truth patches 201 and the training patches 202. This embodiment applies the noises based on each of the signal values of the ground truth patch 201 and the training patch 202, but may apply the same noise to both. Since a captured image corresponds a training patch 202, a noise σ(x,y)·r(x,y) is calculated for the training patch 202 using the expression (1) and applied to a ground truth patch 201.

Next, in the step S104, the generator 101c inputs the noise training patch (second training image) 212 into the multilayer neural network, and generates an estimated patch (estimated image) 213. The estimated patch 213 is a noise training patch 212 in which a noise variation is suppressed and a blur is corrected, and may coincide with a noise ground truth patch (second ground truth image) 211. This embodiment uses a neural network configuration illustrated in FIG. 1 but the present invention is not limited to this. In FIG. 1, CN represents a convolution layer, and DC represents a deconvolution layer. Each of CN and DC calculates a convolution of an input and a filter and the sum with a bias, and perform a nonlinear transformation on the result using an activation function. Each component of the filter and an initial value of the bias are arbitrary, and determined by random numbers in this embodiment. As the activation function, for example, an ReLU (Rectified Linear Unit) or a sigmoid function can be used. The output of each layer except a last layer is called a feature map. Skip connections 222 and 223 combine feature maps output from discontinuous layers. A combination of the feature maps may be the sum of each element or may be connected in the channel direction (concatenation). This embodiment adopts the sum of each element. The skip connection 221 generates an estimated patch 213 by taking the sum of estimated residuals of the noise training patch 212 and the noise ground truth patch 211, and the noise training patch 212. The estimated patch 213 is generated for each of the plurality of the noise training patches 212.

Next in the step S105, the updater 101d updates the weight (weight information) for the neural network based on an error between the estimated patch 213 and the noise ground truth patch (second ground truth image) 211. The weight includes a filter component and a bias of each layer. The weight is updated using a backpropagation method, but the present invention is not limited to this. Since it is mini-batch learning, the errors of the plurality of noise ground truth patches 211 and the corresponding estimated patches 213 are calculated, and the weight is updated. As an error function (Loss function), for example, an L2 norm or an L1 norm may be used.

In the step S106, the updater 101d determines whether the weight learning has been completed. The completion can be determined based on whether the number of iterations of learning (weight updating) has reached a specified value, or whether a weight variation amount during updating is smaller than a specified value. If the weight learning is determined to be not completed, the process returns to the step S101 to newly obtain a plurality of ground truth patches and training patches. On the other hand, if the weight learning is determined to be completed, the learning apparatus 101 (updater 101d) terminates the learning, and records the weight information on the memory 101a. Learning the blur correction using the noise ground truth patches and the noise training patches to which the noise based on the same random number has been applied, the neural network can learn by separating the object and the applied noise, and can correct only an object blur while suppressing the noise variation.

Figure 5:
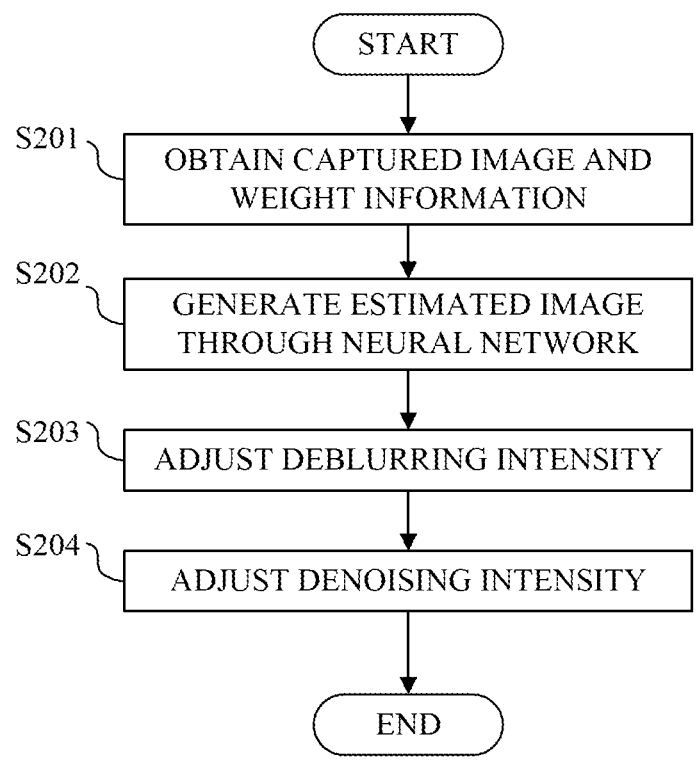
FIG. 5 is a flowchart relating to output image generation according to the first embodiment.

Referring now to FIG. 5, a description will be given of an output image generated by the image estimating apparatus 103 in this embodiment. FIG. 5 is a flowchart relating to the generation of the output image. Mainly, the obtainer 103b, the blur corrector 103c, or the denoiser 103d in the image estimating apparatus 103 executes each step in FIG. 5.

In the step S201, the obtainer 103b obtains information on a captured image and a weight. The captured image is an undeveloped RAW image as well as the learning, and is transmitted from the imaging apparatus 102 in this embodiment. The weight information has been transmitted from the learning apparatus 101 and recorded on the memory 103a.

Next, in the step S202, the blur corrector 103c inputs the captured image into the multilayer neural network to which the obtained weight is applied, and generates an estimated image. The estimated image is an image obtained from the captured image in which blurs caused by the aberration and the diffraction of the optical system 102a is corrected while the noise variation is suppressed. Thus, a noise amount in the captured image is equivalent to that in the estimated image. A neural network with the same configuration illustrated in FIG. 1 generates the estimated image. When the captured image is input into the neural network, it is not necessary to cut out the captured image into the same size as the training patch that is used for learning.

In the step S203, the blur corrector 103c adjusts the intensity of the blur correction based on the user's selection. The intensity of the blur correction is adjusted using a weighted average of the captured image $I_{org}$ and the estimated image $I_{inf}$, which are represented by the following expression (3).

$$I_{out}=(1-\alpha)I_{org}+\alpha I_{inf} \quad (3)$$

In the expression (3), $I_{out}$ is an output image in which the intensity of the blur correction is adjusted, and a weight α takes an arbitrary value from 0 and 1 based on the user's selection. The closer to 1 the weight α is, the greater the blur correction intensity is. As a noise variation is suppressed in the estimated image $I_{inf}$ compared to the captured image $I_{org}$, a noise variation of the output image $I_{out}$ which is a weighted average of both, is suppressed.

In the step S204, the denoiser 103d adjusts denoising intensity for the output image based on the user's selection. The denoising method is not limited to the method in this embodiment. As a denoising method, for example, a method using a bilateral filter, an NLM (non-local means) filter, a BM3D (Block-matching and 3D filtering), or a method using a multilayer neural network may be used. A parameter for determining the denoising intensity (denoising parameter) may be determined based on an optical black signal value of the captured image. An noise amount existing in the captured image can be estimated using the optical black signal value. Since the present invention can suppress the noise variation associated with the blur correction, the noise amount of the captured image and the noise amount of the estimated image substantially coincide with each other. Thus, denoising of the output image may be determined by a denoising parameter determined based on information on an optical black of the captured image. The denoising parameter used during the denoising executed on the output image may be the same as a parameter used during denoising the captured image. Since the output image is the RAW image, development processing is executed as necessary.

According to the above configuration, since the deblurring and the denoising are separately processed, the user can individually set respective intensities and perform editing as intended. If a noise training patch is input into a neural network and learning is performed using an error between an estimated patch and a ground truth patch having no noise, the neural network learns both the blur correction and the denoising. If the deblurring intensity is adjusted in this neural network in the step S203, the denoising intensity also changes at the same time. Namely, in this case, the deblurring and denoising intensities may not be set individually and the user may not perform editing as intended. Thus, the configuration which realizes the blur correction with the suppressed noise variation and which performs the denoising separately on an image after the blur correction, can ensure the flexibility in editing and support editing as intended by the user.

A description will now be given of how the estimated image changes if noises based on different random numbers are applied to the ground truth patch and the training patch will be described. In this case, the noises in the noise ground truth patch and the noise training patch have no correlation with each other. The neural network is trained to change noise components in the noise training patch into different noises. The noises randomly change for each of a plurality of patch sets (sets of the noise ground truth patch and the noise training patch). A CNN (convolutional neural network) illustrated in FIG. 1 learns an average of the random changes. That is, the random noises to be output are averaged by learning the plurality of patch sets, and as a result, estimated images are denoised images. Thus, in this case, the editing flexibility lowers for the user, as described above.

Although this embodiment has described the correction of the blurs caused by the aberration and the diffraction, the present invention is similarly effective to blurs caused by the other factors (defocus, shake, and the like). In learning, by changing the blur to be applied to the training patch into that for the defocus, shake etc., the blur caused by the defocus etc. can be corrected while the noise variation is suppressed.

The present invention is applicable to upsampling, which makes higher the resolution, in addition to deblurring. A detailed description will now be given of learning with an example where the one-dimensional upsampling rate is 2. A noise ground truth patch is obtained by applying noises to a ground truth patch based on a random number sequence as the same manner as the blur correction. Subsequently, a training patch is generated by sampling one pixel in every two pixels from the ground truth patch (downsampling to ½ in one dimension). Similarly, the random number sequence is alternately sampled, and a noise training patch is obtained by applying noises to the training patch based on the downsampled random number sequence. In previous upsampling, the generated noise training patch is directly input into the neural network as it is, in order to calculate an error and learn a weight. In previous upsampling, a bilinear interpolation or the like performs the upsampling on the noise training patch and the noise training patch is input into the neural network and the error calculation and weight learning are performed.

The present invention is applicable to brightness improving processing such as a peripheral light amount correction. At this time, the neural network learns as follows. For one same original image, a captured equivalent image generated by reducing the brightness according to a peripheral light falloff, and an ideal equivalent image with no brightness reduction (or with smaller reduction than that of the captured equivalent image) are generated. Extracting a plurality of training patches and ground truth patches from a plurality of the generated captured equivalent images and the generated ideal equivalent images, and learning in the same manner as that of the first embodiment can suppress a noise variation even during the brightness improving processing.

The present invention is applicable to a defocus blur conversion. The defocus blur conversion is processing of converting a defocus blur in a captured image into a shape and a distribution desired by a user. The defocus blur in the captured image may contain chipping caused by vignetting, a double-line blur, an annular pattern caused by a cutting mark of the aspherical lens, a shielded center caused by a catadioptric optical system, and the like. The neural network converts these defocus blurs into a shape and a distribution desired by a user (for example, a flat circle or a normal distribution function). This neural network learns as follows. For the same original image, a captured equivalent image obtained by applying a defocus blur generated in a captured image and an ideal equivalent image obtained by applying a defocus blur desired by the user, are generated for each of a plurality of defocus amounts. However, since the defocus blur conversion is demanded not to affect the object at the in-focus distance, the captured equivalent image and the ideal equivalent image with a defocus amount of zero are generated as well. The noise variation can be suppressed even during the defocus blur conversion by extracting a plurality of training patches and ground truth patches from each of the generated plurality of captured equivalent images and ideal equivalent images and by learning in the same manner as that of the first embodiment.

The present invention is applicable to a lighting conversion. The lighting conversion refers to processing of changing lighting of a captured image into different lighting. The neural network learns the lighting conversion by the following method. A captured equivalent image is generated by rendering an original image of the same normal map under a light source environment assumed in the captured image. Similarly, an ideal equivalent image is generated by rendering the normal map under a light source environment desired by a user. Extracting a plurality of training patches and around truth patches from the captured equivalent image and the ideal equivalent image, respectively, and learning in the same manner as that of the first embodiment can suppress a noise variation even during in the lighting conversion.

The present invention is also applicable to contrast improving processing. This will be specifically described in a second embodiment.

This embodiment has described an example in which the learning apparatus 101 and the image estimating apparatus 103 are separated members, but the present invention is not limited to this embodiment. The learning apparatus 101 and the image estimating apparatus 103 may be integrated with each other. That is, learning (processing illustrated in FIG. 4) and estimating (processing illustrated in FIG. 5) may be performed in one integrated apparatus.

According to the above configuration, this embodiment can provide an image processing system which suppresses an image noise variation associated with image processing.

Second Embodiment

Next follows a description of an image processing system according to a second embodiment of the present invention. This embodiment makes a multilayer neural network learn and execute haze removing which makes the contrast higher. However, this embodiment is applicable to other image processing as well as the first embodiment.

Figure 6:
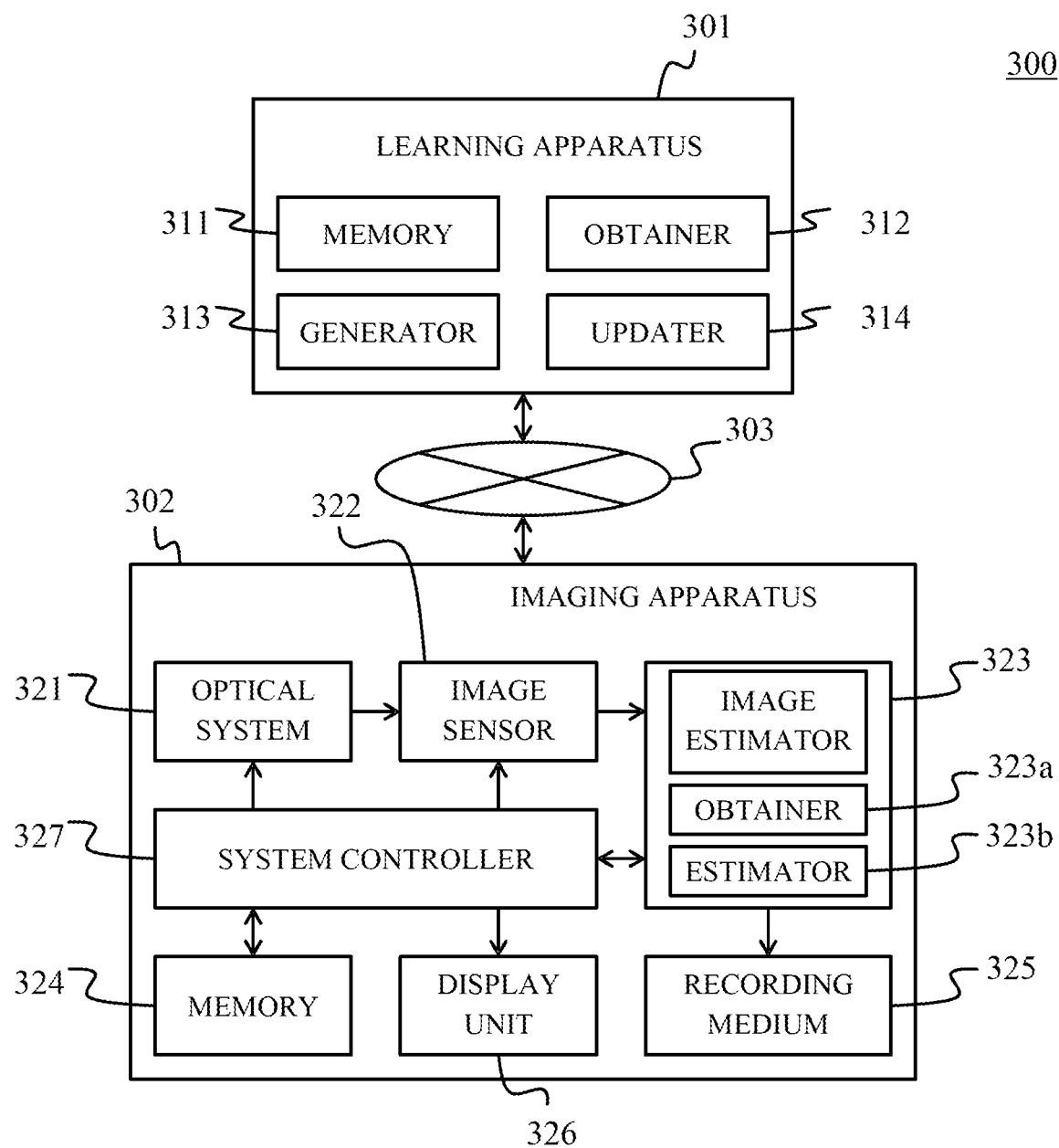
FIG. 6 is a block diagram of an image processing system according to a second embodiment.
Figure 7:
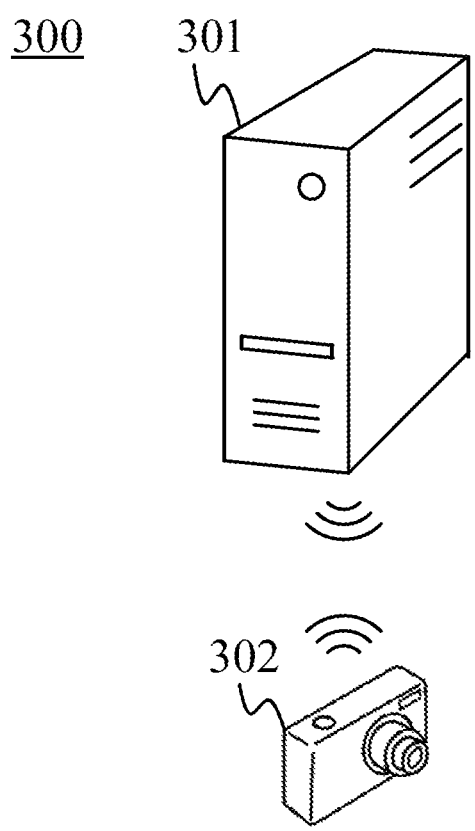
FIG. 7 is an external view of an image processing system according to the second embodiment.

FIG. 6 is a block diagram of the image processing system 300 according to this embodiment. FIG. 7 is an external view of the image processing system 300. The image processing system 300 includes a learning apparatus (image processing apparatus) 301 and an imaging apparatus 302 which are connected via a network 303. The learning apparatus 301 includes a memory 301, an obtainer 312, a generator 313, and an updater (learner) 314, and learns the weight (weight information) to perform haze removing in a neural network. The imaging apparatus 302 obtains a captured image by imaging an object space, and removes a haze from the captured image using read the weight information. A detailed description will be given of weight learning performed by the learning apparatus 301 and haze removing performed by the imaging apparatus 302. The imaging apparatus 302 includes an optical system 321 and an image sensor 322. The contrast of the object in the captured image obtained by the image sensor 322 has decreased caused by the haze existing in the object space. The image estimator 323 includes an obtainer 323a and an estimator 323b, and performs haze removing on the captured image using the weight information recorded on a memory 324.

The weight information is previously learned by the learning apparatus 301 and stored in a memory 311. The imaging apparatus 302 reads out the weight information from the memory 311 via the network 303, and records the weight information in the memory 324. A recording medium 325 records the captured image on which the haze removing has been performed (output image). When a user issues an instruction regarding a display unit of the output image, the recorded output image is read out and displayed on a display unit 326. The captured image already recorded on the recording medium 325 may be read out, and the image estimator 323 may perform the haze removing. The system controller 327 performs the above controls.

Figure 8:
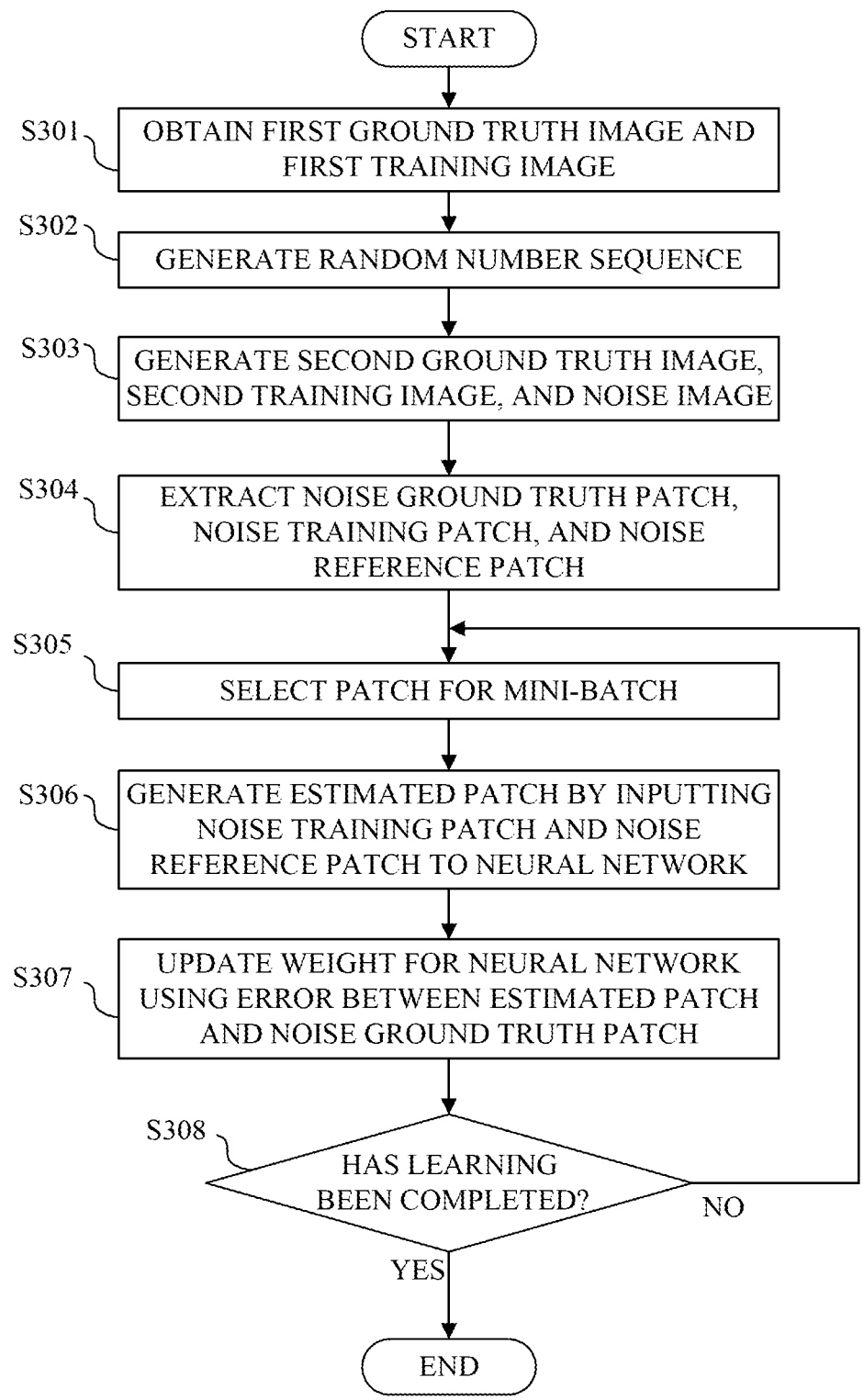
FIG. 8 is a flowchart relating to weight learning according to the second embodiment.
Figure 9:
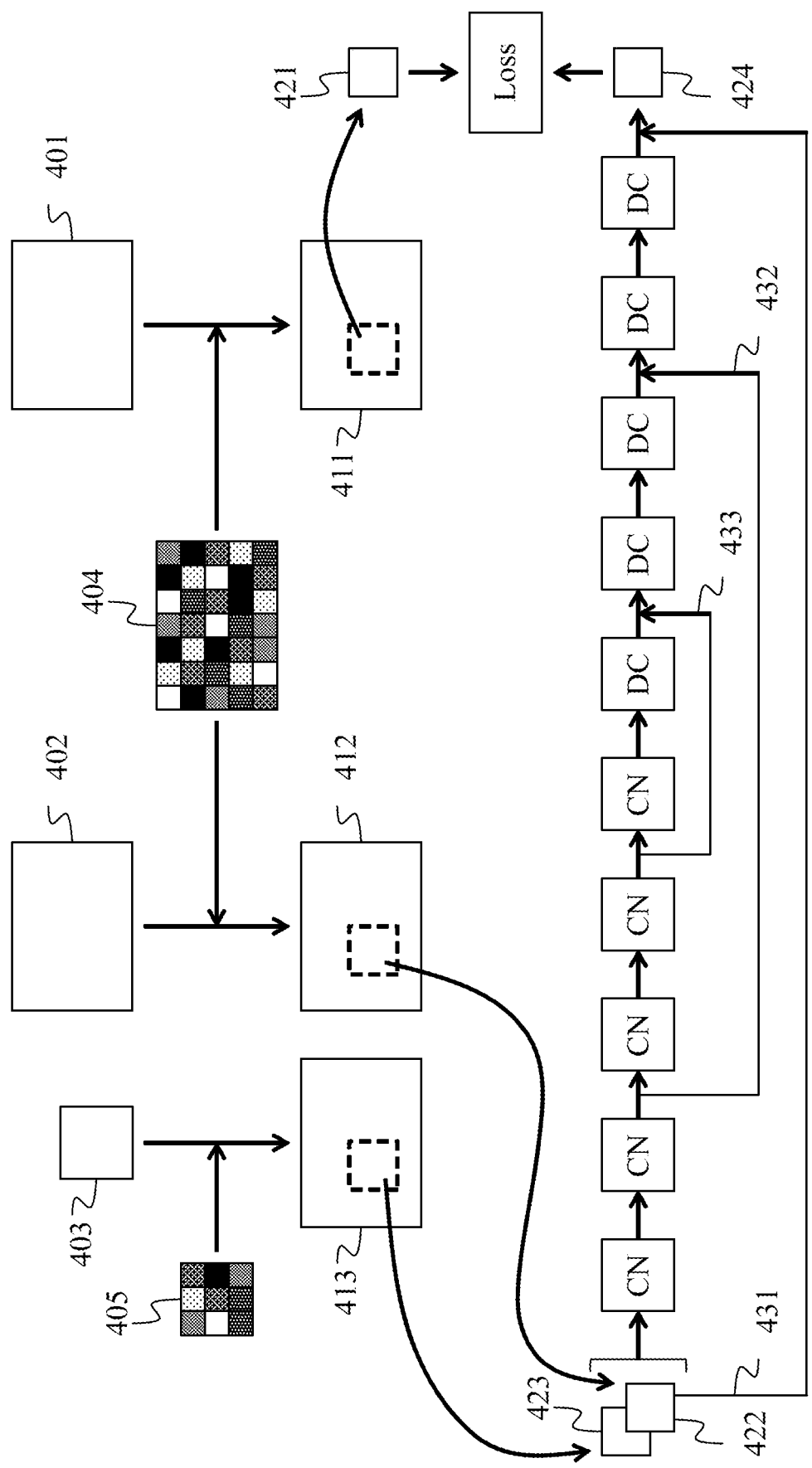
FIG. 9 is a diagram illustrating a flow of neural network learning according to the second embodiment.

Referring now to FIGS. 8 and 9, a description will be given of weight learning (weight information) by the learning apparatus 301 in this embodiment. FIG. 8 illustrates a flow of weight learning in a neural network. FIG. 9 is a flowchart relating to the weight learning. Mainly, the obtainer 312, the generator 313, or the updater 314 in the learning apparatus 301 executes each step in FIG. 8.

The first embodiment applied a noise to a patch having a predetermined number of pixels. In contrast, this embodiment applies a noise to an image having a size larger than a patch, and extracts the patch therefrom. This embodiment inputs not only a noise training patch (a patch having hazes and noises) but also a noise reference patch (a patch representing a noise amount for a specific signal value) into the neural network. This embodiment directly inputs the noise amount into the neural network through the noise reference patch, and increases the robustness against noises.

First, in the step S301 in FIG. 8, the obtainer 312 obtains a no-haze image (first ground truth image) 401 and a hazed image (first training image) 402. As well as the first embodiment, using a simulation, this embodiment generates one or more set of a no-haze image 401 and a hazed image 402 by applying various densities of hazes to one or more original image recorded on the memory 311. The hazed image 402 is a whitish image in which the contrast is lower than the no-haze image 401, caused by a scattered light caused by the haze. The no-haze image and the hazed image are undeveloped RAW images.

In the step S302, the generator 313 generates a random number sequence. This embodiment generates two random number sequences for one set of the no-haze image 401 and the hazed image 402. The subsequent steps apply noises to the no-haze image 401 and the hazed image 402 based on a first random number sequence 404, and generate a noise image 413 based on a second random number sequence 405. The first random number sequence 404 and the second random number sequence 405 have different numerical values each other. The number of elements of the first random number sequence 404 coincides with the number of pixels in the no-haze image 401 or the hazed image 402. The number of elements of the second random number sequence 405 is $N_0$, and need not coincide with the number of elements of the first random number sequence 404. When there are a plurality of sets of the no-haze image 401 and the hazed image 402, the first and second random number sequences 404 and 405 are generated for each set. The first random number sequence 404 for each set has different numerical values. The same applies to the second random number sequence 405.

In the step S303, the generator 313 generates a no-haze image having noises (second ground truth image) 411, a hazed image having noises (second training image) 412, and a noise image 413. The no-haze image having the noises 411 is generated by applying noises based on the first random number sequence 404 to the no-haze image 401. The no-haze image 412 having the noises is generated by applying noises to the hazed image 402 in the same manner. A method of applying the noises is the same as that of the first embodiment. A noise based on the same random number is applied to pixels of the no-haze image 401 and the hazed image 402 that have captured the same position in the object space. The noise image 413 is generated by applying noises to a specific signal value based on the second random number sequence 405. Although there is no particular limitation on the specific signal value, this embodiment uses a signal value $s_0$ of an optical black in an image sensor 322. Noises based on the second random number sequence 405 are applied to an image 403 having number of pixels of $N_0$ and having a signal value $s_0$. The noise image 413 is an image in which images to which noise has been applied are arranged so as to make the image have the same number of pixels as the second training image 412. A standard deviation of the noises applied to the noise image 413 is determined under the same condition as where the second training image 412 has been generated. Thus, the noise standard deviation between the noise image 413 and a pixel of the signal value of $s_0$ in the second training image 412 are the same. When there are a plurality of sets of the no-haze image 401 and the hazed image 402, the same processing is performed on each set.

Subsequently, in the step S304, the generator 313 extracts a plurality of noise ground truth patches 421, noise training patches 422, and noise reference patches 423. The noise ground truth patch 421 is extracted from the second ground truth image 411, the noise training patch 422 is extracted from the second training image 412, and the noise reference patch 423 is extracted from the noise image 413. Each of the noise ground truth patch 421 and the noise training patch 422 include an area which has imaged the same position in an object space, but the number of pixels may not necessarily be equal to each other. The noise training patch 422 and the noise reference patch 423 are partial areas at the same positions in the second training image 412 and the noise image 413, respectively, and both have the number of pixels of $N_0$. A plurality of patch sets (each of which including a noise ground truth patch 421, a noise training patch 422, and a noise reference patch 423) are extracted for each set of the second ground truth image 411 and the second training image 412.

In the step S305, the obtainer 312 selects patch sets for use in mini-batch learning. In this embodiment, the obtainer 312 selects two or more patch sets from the plurality of patch sets extracted in the step S304. In the step S306, the generator 313 inputs the noise training patch 422 and the noise reference patch 423 from the selected patch set to the multilayer neural network, and generates an estimated patch 424. The noise training patch 422 and the noise reference patch 423 are connected in a channel direction and input into the multilayer neural network. Skip connections 432 and 433 are the same as those of the first embodiment. A skip connection 431 calculates the sum of an output of the final layer and each element of the noise training patch 422. The same processing is performed for each of the plurality of selected patch sets.

In the step S307, the updater 314 updates the weight of the neural network from errors between the estimated patches 424 and the noise ground truth patches 421. Next, in the step S308, the updater 314 determines whether the learning has been completed. If it is determined that the learning is not completed, the process returns to the step 305 and newly selects a plurality of patch sets. If it is determined that the learning has been completed, the updater 314 records the weight information on the memory 311.

Figure 10:
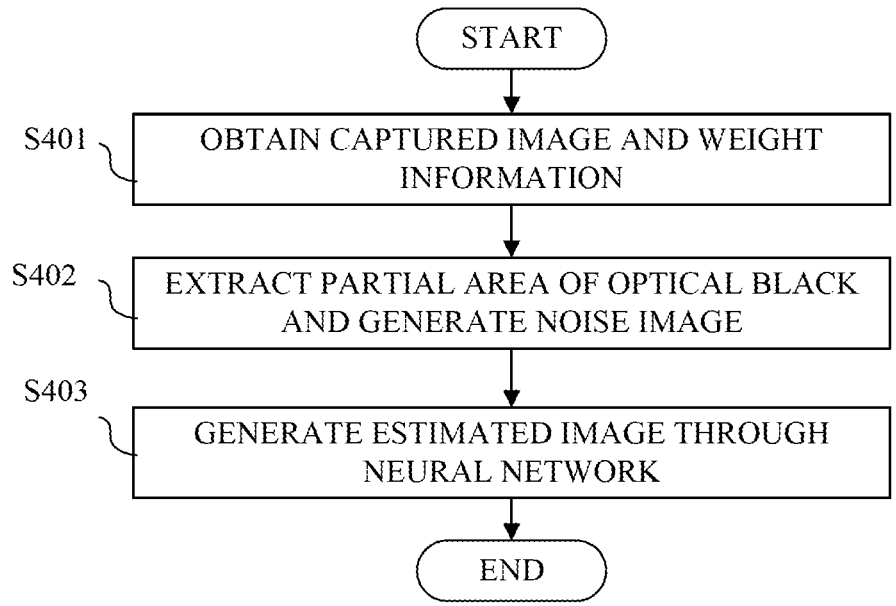
FIG. 10 is a flowchart relating to a generation of an output image according to the second embodiment.

Referring now to FIG. 10, a description will be given of haze removing processing of a captured image performed by the image estimator 323 according to this embodiment. FIG. 10 is a flowchart relating to the haze removing processing (output image generation by the image estimator 323). Mainly, the obtainer 323a or the estimator 323b in the image estimator 323 executes each step in FIG. 10.

Figure 11:
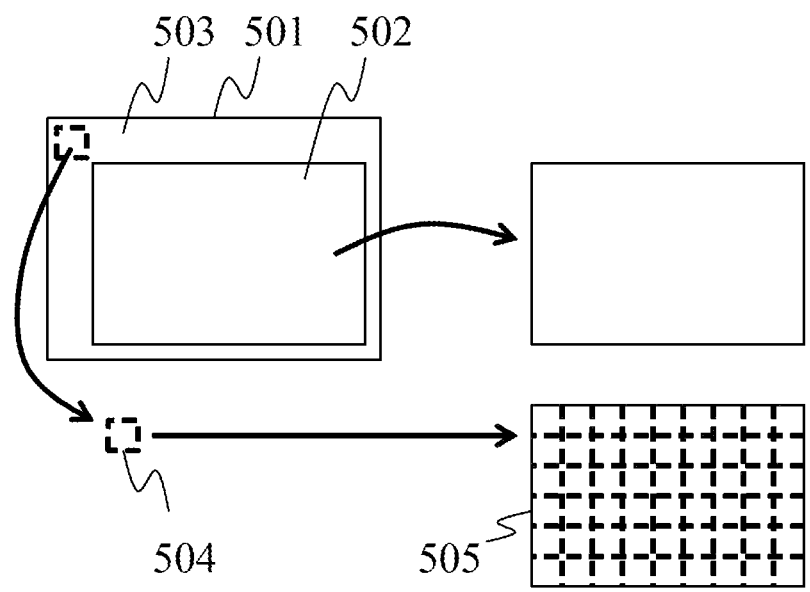
FIG. 11 is a diagram illustrating a generation of a noise image in generating the output image according to the second embodiment.

First, in the step S401, the obtainer 323a obtains information on a captured image and a weight. In the step S402, the obtainer 323a extracts a partial area from an optical black (a black-level image) of the captured image, and generates a noise image. This will be described with reference to FIG. 11. FIG. 11 illustrates a generation of the noise image in generating the output image according to this embodiment. The captured image 501 is an undeveloped RAW image, and has an image area 502 and an optical black 503. The obtainer 323*a* extracts partial areas 504 from the optical black 503. The number of pixels of each partial area 504 is $N_O$, and the partial areas 504 are arranged to generate a noise image 505. The noise image 505 has the same number of pixels as that of the image area 502. The image area 502 and the noise image 505 are connected in a channel direction and are input into the neural network. However, the present invention is not limited to this. For example, the noise image 505 may have the same number of pixels as that of the captured image 501, and the both may be connected and input into the neural network.

In the step S403 in FIG. 10, the estimator 323*b* generates an estimated image for the input by connecting the image area and the noise image with the neural network using the learned weight. This embodiment does not adjust the haze removing intensity, and uses, as it is, the estimated image as an output image. The above processing can estimate a high-contrast image in which the haze is removed with high accuracy while a noise variation is suppressed. The same processing can obtain the same effect in imaging through another scatterer such as fog. This embodiment can provide an image processing system which suppresses an image noise variation associated with image processing.

Third Embodiment

A description will now be given of an image processing system according to a third embodiment of the present invention. Different from the first and the second embodiments, the image processing system according to this embodiment includes a processing apparatus (computer) that transmits, to the image estimating apparatus, a captured image that is an image processing target, and that receives a processed output image from the image estimating apparatus.

Figure 12:
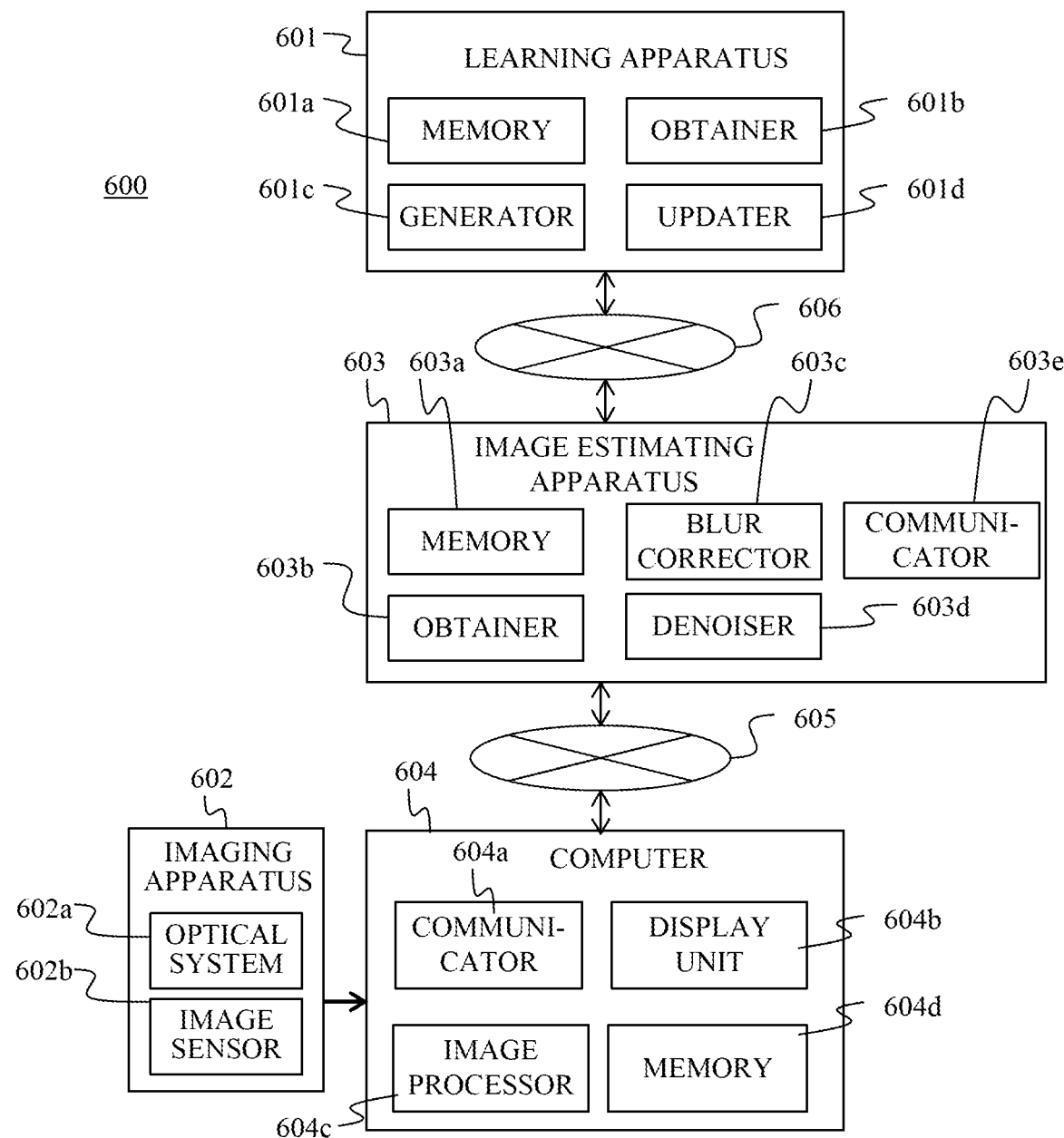
FIG. 12 is a block diagram of an image processing system according to a third embodiment.

FIG. 12 is a block diagram of an image processing system 600 according to this embodiment. The image processing system 600 includes a learning apparatus 601, an imaging apparatus 602, an image estimating apparatus 603, and a processing apparatus (computer) 604. The learning apparatus 601 and the image estimating apparatus 603 are, for example, servers. The computer 604 is, for example, a user terminal (a personal computer or a smartphone). The computer 604 is connected to the image estimating apparatus 603 via a network 605. The image estimating apparatus 603 is connected to the learning apparatus 601 via a network 606. That is, the computer 604 and the image estimating apparatus 603 are communicable with each other, and the image estimating apparatus 603 and the learning apparatus 601 are communicable with each other. The computer 604 corresponds to a first apparatus, and the image estimating apparatus 603 corresponds to a second apparatus. The configuration of the learning apparatus 601 is the same as that of the learning apparatus 101 in the first embodiment, and a description thereof will be omitted. The configuration of the imaging apparatus 602 is the same as that of the imaging apparatus 102 in the first embodiment, and a description thereof will be omitted.

The image estimating apparatus 603 includes a memory 603*a*, an obtainer 603*b*, a blur corrector 603*c*, a denoiser 603*d*, and a communicator (receiver) 603*e*. The memory 603*a*, the obtainer 603*b*, the blur corrector 603*c*, and the denoiser 603*d* correspond to the memory 103*a*, the obtainer 103*b*, the blur corrector 103*c*, and the denoiser 103*d* in the image estimating apparatus 103 in the first embodiment, respectively. The communicator 603*e* has a function of receiving a request transmitted from the computer 604 and a function of transmitting, to the computer 604, an output image generated by the image estimating apparatus 603.

The computer 604 includes a communicator (transmitter) 604*a*, a display unit 604*b*, an image processer 604*c*, and a recorder 604*d*. The communicator 604*a* has a function of transmitting a request to the image estimating apparatus 603 for making the image estimating apparatus 603 process a captured image, and a function of receiving an output image processed by the image estimating apparatus 603. The display unit 604*b* has a function of displaying various information. The information displayed on the display unit 604*b* includes, for example, a captured image to transmit to the image estimating apparatus 603, and an output image received from the image estimating apparatus 603. The image processor 604*c* has a function of performing further image processing on an output image received from the image estimating apparatus 603. The recorder 604*d* records a captured image obtained from the imaging apparatus 602, an output image received from the image estimating apparatus 603, and the like.

Figure 13:
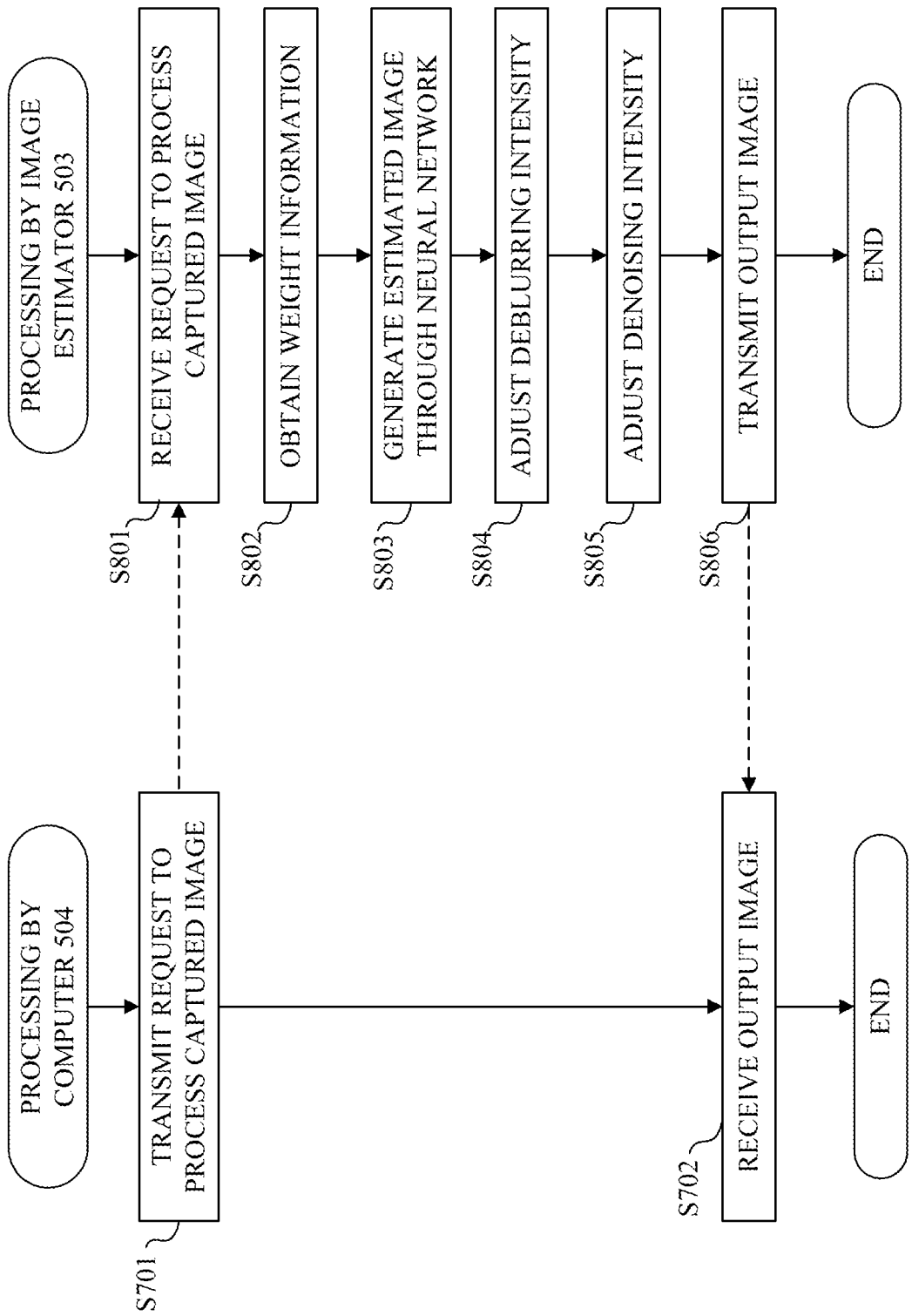
FIG. 13 is a flowchart relating to a generation of an output image according to the third embodiment.

Next, image processing according to this embodiment will be described with reference to FIG. 13. The image processing in this embodiment is equivalent to the deblurring processing (FIG. 5) described in the first embodiment. FIG. 13 is a flowchart relating to the generation of the output image. The image processing illustrated in FIG. 13 starts when a user issues an instruction to start the image processing via the computer 604. The operation of the computer 604 will be described.

In the step S701, the computer 604 transmits a request to process a captured image to the image estimating apparatus 603. The method of transmitting the captured image to be processed to the image estimating apparatus 603 does not matter. For example, the captured image may be uploaded to the image estimating apparatus 603 at the same time as the step S701, or may be uploaded to the image estimating apparatus 603 before the step S701. The captured image may be an image recorded on a server different from the image estimating apparatus 603. In the step S701, the computer 604 may transmit ID information or the like for authenticating the user together with the request to process the captured image.

In the step S702, the computer 604 receives the output image generated in the image estimating apparatus 603. The output image is an image obtained by deblurring the captured image similarly to the first embodiment.

Next, the operation of the image estimating apparatus 603 will be described. In the step S801, the image estimating apparatus 603 receives the request to process the captured image from the computer 604. The image estimating apparatus 603 determines that processing (deblurring) the captured image has been instructed, and processes it in the step S802 and subsequent steps.

In the step S802, the image estimating apparatus 603 obtains weight information. The weight information is information learned using the same method as in the first embodiment (FIG. 4) (learnt model). The image estimating apparatus 603 may obtain the weight information from the learning apparatus 601 or may obtain the weight information that has been obtained from the learning apparatus 601 and recorded in the memory 603*a* in advance. The steps S803 to S805 are the same as the steps S202 to S204 of the first embodiment. In the step S806, the image estimating apparatus 603 transmits the output image to the computer 604.

Although this embodiment has described deblurring processing of the first embodiment, the present invention is similarly applicable to the haze removing processing (FIG. 10) of the second embodiment. In this embodiment, an example is described in which the image estimating apparatus 603 adjusts both the deblurring and denoising (noise reduction) intensities, but the image processor 604c in the computer 604c may adjust them. When the image estimating apparatus 603 performs the denoising processing as in this embodiment, the image estimating apparatus 603 can bear the processing load of the denoising processing, and can reduce the processing capability required on the computer 604. When the image processor 604c in the computer 604 performs the denoising processing, the user does not need to operate to communicate with the image estimating apparatus 603 every time the denoising processing is performed.

As described above, as in this embodiment, the computer 604 communicably connected to the image estimating apparatus 603 may be configured to control the image estimating apparatus 603.

As described above, in each embodiment, an image processing apparatus (learning apparatuses 101 and 301) includes an obtainer (obtainers 101b and 312), a generator (generators 101c and 313), and a learner (updaters 101d and 314). The obtainer obtains a first ground truth image and a first training image in a first step. The generator generates a second ground truth image and a second training image by applying mutually correlated noises to the first ground truth image and the first training image, in a second step. The learner makes a multilayer neural network learn based on the second ground truth image and the second training image in a third step.

The second step may generate the second ground truth image and the second training image by applying a correlated noise to each of the corresponding pixels in the first ground truth image and the first training image, respectively. The corresponding pixels may be pixels that image the same position in the object space in each of the first ground truth image and the first training image. The corresponding pixels may be pixels at the same position in the first ground truth image and the first training image.

The noise may be based on the same random number. The random number may have different values for at least two pixels in the first ground truth image. Among the noises, the noise applied to the first ground truth image may be determined based on a signal value of a pixel in the first ground truth image, and among the noises, the noise applied to the first training image may be determined based on a signal value of a pixel in the first training image. A dispersion of the noises may include a proportional component proportional to the signal values of the pixels in each of the first ground truth image and the first training image, and a constant component.

The noises given to the first ground truth image and the first training image may be the same. The noise may be determined based on a signal value of a pixel in the first training image. The learner may input at least part of the second training image and a noise reference patch generated based on a noise that is different from the noise and is generated based on the noise, to the multilayer neural network. The learner compares an output estimated patch with at least part of the second around truth image.

Each of the first ground truth image and the first training image may be an image generated by executing different processing on the same original image (created by a simulation). At least one of values of resolution, contrast, and brightness in the first training image may be lower than that in the first ground truth image. The first ground truth image and the first training image may be images generated based on the same original image. The first training image is an image in which at least one of downsampling processing, blurring processing, contrast reduction processing, and brightness reduction processing has been performed on the original image. The learner may make the multilayer neural network learn such that the multilayer neural network is furnished to have at least one of functions of upsampling processing, deblurring processing, contrast improving processing, and brightness improving processing. Each of the first ground truth image and the first training image may be an image generated by applying a different blur to at least part of the same original image. The first ground truth image and the first training image may be images generated by rendering the same normal map under different light source environments.

In each embodiment, an image processing apparatus (image estimating apparatus 103 and image estimator 323) includes an estimator (blur corrector 103c and estimator 323b) and a processor (denoiser 103d and estimator 323b). The estimator inputs a captured image to a multilayer neural network, and generates an estimated image on which at least one of resolution enhancing processing, contrast improving processing, and brightness improving processing has been performed. The processor performs denoising processing on an image based on the estimated image. A noise amount in the captured image and a noise amount in the estimated image may be substantially the same. Herein, "substantially the same" indicates not only a case where the noise amount is the same in the strict sense but also a case where the noise amount is evaluated to be substantially the same (equivalent). The multilayer neural network may be based on a learnt model learned using a learning method including a first step, a second step, and a third step.

In each embodiment, an image processing system includes a first apparatus and a second apparatus communicable with the first apparatus. The first apparatus has transmitter configured to transmit a request to make the second apparatus process a captured image. The second apparatus includes a receiver configured to receive the request transmitted by the transmitter, and an estimator configured to input the captured image to a multilayer neural network, and configured to generate an estimated image on which at least one of resolution enhancing processing, contrast enhancing processing, and brightness improving processing is performed. At least one of the first apparatus and the second apparatus further includes a denoiser configured to perform denoising processing on an image based on the estimated image.

Other Embodiment

Embodiment(s) of the present invention can also be realized by a computer of a system or apparatus that reads out and executes computer executable instructions (e.g., one or more programs) recorded on a memory medium (which may also be referred to more fully as a 'non-transitory computer-readable memory medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the memory medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the memory medium. The memory medium may include, for example, one or more of a hard disk, a random-access memory (RAM), a read only memory (ROM), a memory of distributed computing systems, an optical disk (such as a compact disc (CD), digital versatile disc (DVD), or Blu-ray Disc (BD)™), a flash memory device, a memory card, and the like.

According to the above embodiments, it is possible to provide an image processing method or the like that can suppress an image noise variation associated with image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-039089, filed on Mar. 5, 2019 which is hereby incorporated by reference herein in its entirety.

What is claimed is:

1. An image processing method comprising:
a first step configured to obtain a first ground truth image and a first training image;
a second step configured to generate a second ground truth image and a second training image by applying mutually correlated noises to the first ground truth image and the first training image; and
a third step configured to make a neural network learn based on the second ground truth image and the second training image.

2. The image processing method according to claim 1, wherein the second step generates the second ground truth image and the second training image by applying the mutually correlated noises to corresponding pixels in the first ground truth image and the first training image.

3. The image processing method according to claim 1, wherein the noises are based on an identical random number.

4. The image processing method according to claim 3, wherein the random numbers are different values for at least two pixels in the first ground truth image.

5. The image processing method according to claim 1, wherein among the noises, the noise applied to the first ground truth image is determined based on a signal value of a pixel in the first ground truth image, and
wherein the noise applied to the first training image is determined based on a signal value of a pixel in the first training image.

6. The image processing method according to claim 1, wherein a dispersion of the noises includes:
a proportional component proportional to a signal value of a pixel in each of the first ground truth image and the first training images; and
a constant component.

7. The image processing method according to claim 1, wherein the noises applied to the first ground truth image and the first training image are the same.

8. The image processing method according to claim 7, wherein the noises are determined based on a signal value of a pixel in the first training image.

9. The image processing method according to claim 1, wherein the third step inputs at least part of the second training image and a noise reference patch generated based on a noise that is different from and generated based on at least one of the noises, into the neural network, and compares an output estimated patch and the at least part of the second ground truth image with each other.

10. The image processing method according to claim 1, wherein each of the first ground truth image and the first training image is generated by performing different processing on an identical original image.

11. The image processing method according to claim 1, wherein in the first training image, at least one of values of a resolution, a contrast, and a brightness is lower than that in the first ground truth image.

12. The image processing method according to claim 1, wherein the first ground truth image and the first training image are generated based on an identical original image, and
wherein the first training image is made by performing at least one of downsampling processing, blurring processing, contrast reduction processing, and brightness reduction processing on the original image.

13. The image processing method according to claim 12, wherein, the third step makes the neural network learn such that the neural network has a function of at least one of upsampling processing, deblurring processing, contrast enhancing processing, and brightness enhancing processing.

14. An image processing apparatus comprising:
one or more memories configured to store instructions; and
one or more processors configured to execute the instructions stored in the one or more memories to implement:
an obtainer configured to obtain a first ground truth image and a first training image;
a generator configured to generate a second ground truth image and a second training image by applying mutually correlated noises to the first ground truth image and the first training image; and
a learner configured to make a neural network learn based on the second ground truth image and the second training image.

15. A learnt model manufacturing method comprising:
a first step configured to obtain a first ground truth image and a first training image;
a second step configured to generate a second ground truth image and a second training image by applying mutually correlated noises to the first ground truth image and the first training image; and
a third step configured to make a neural network learn based on the second ground truth image and the second training image.

16. An image processing method comprising the steps of:
inputting a captured image into a neural network, and generating an estimated image on which at least one of resolution enhancing processing, contrast enhancing processing, and brightness improving processing has been performed; and
performing denoising processing on an image based on the estimated image,
wherein a denoising parameter used in the denoising processing is determined based on information on an optical black of the captured image.

17. The image processing method according to claim 16, wherein a noise amount in the captured image is equivalent to that in the estimated image.

18. The image processing method according to claim 16, wherein a denoising parameter used in the denoising processing performed on an image based on the estimated image is the same as a parameter used when the denoising processing is performed on the captured image.

19. The image processing method according to claim 16, wherein the neural network is based on a learnt model learned using a learning method that includes:
   a first step configured to obtain a first ground truth image and a first training image;
   a second step configured to generate a second ground truth image and a second training image by applying mutually correlated noises to the first ground truth image and the first training image; and
   a third step configured to make a neural network learn based on the second ground truth image and the second training image.

20. An image processing apparatus comprising:
   one or more memories configured to store instructions; and
   one or more processors configured to execute the instructions stored in the one or more memories to implement:
   an estimator configured to input a captured image into a neural network and to generate an estimated image on which at least one of resolution enhancing processing, contrast enhancing processing, and brightness improving processing has been performed; and
   a denoiser configured to perform denoising processing on an image based on the estimated image,
   wherein a denoising parameter used in the denoising processing is determined based on information on an optical black of the captured image.

21. An image processing system having a first apparatus and a second apparatus communicable with the first apparatus,
   wherein the first apparatus includes a transmitter configured to transmit a request to make the second apparatus process a captured image,
   wherein the second apparatus includes:
   a receiver configured to receive the request transmitted by the transmitter;
   one or more memories configured to store instructions; and
   one or more processors configured to execute the instructions stored in the one or more memories to implement an estimator configured to input the captured image into a neural network and to generate an estimated image on which at least one of resolution enhancing processing, contrast enhancing processing, and brightness improving processing is performed,
   wherein at least either the first apparatus or the second apparatus further includes a denoiser configured to perform denoising processing on an image based on the estimated image, the denoiser being implemented in the first apparatus by one or more memories configured to store instructions and one or more processors configured to execute the instructions stored in the one or more memories of the first apparatus and being implemented in the second apparatus by the one or more memories configured to store instructions and the one or more processors configured to execute the instructions stored in the one or more memories of the second apparatus, and
   wherein a denoising parameter used in the denoising processing is determined based on information on an optical black of the captured image.

* * * * *